(12) United States Patent
Blank et al.

(10) Patent No.: US 7,605,489 B1
(45) Date of Patent: Oct. 20, 2009

(54) AIRFLOW POWER STATION

(76) Inventors: Anatoly Blank, 2728 E. 23rd St., Brooklyn, NY (US) 11235; Leonio Blank, 2728 E. 23rd St., Brooklyn, NY (US) 11235; Emil Blank, 145 Amnerst St., Brooklyn, NY (US) 11235

( * ) Notice: Subject to any disclaimer, the term of this patent is extended or adjusted under 35 U.S.C. 154(b) by 0 days.

(21) Appl. No.: 12/384,803

(22) Filed: Apr. 9, 2009

(51) Int. Cl.
 *F03D 9/02* (2006.01)
(52) U.S. Cl. .......................... 290/44; 290/55
(58) Field of Classification Search .......... 290/45, 290/43, 44, 54, 55; 60/325; 415/175
 See application file for complete search history.

(56) References Cited

U.S. PATENT DOCUMENTS

| | | | | |
|---|---|---|---|---|
| 3,806,733 A | * | 4/1974 | Haanen | 290/55 |
| 4,206,608 A | * | 6/1980 | Bell | 60/698 |
| 4,229,661 A | * | 10/1980 | Mead et al. | 290/44 |
| 4,447,738 A | * | 5/1984 | Allison | 290/44 |
| 5,553,454 A | * | 9/1996 | Mortner | 60/409 |
| 5,924,283 A | * | 7/1999 | Burke, Jr. | 60/325 |
| 6,054,838 A | * | 4/2000 | Tsatsis | 320/101 |
| 6,960,062 B2 | * | 11/2005 | Blank et al. | 415/175 |
| 7,005,757 B2 | * | 2/2006 | Pandian | 290/1 R |
| 7,468,564 B2 | * | 12/2008 | Crisafulli | 290/52 |

* cited by examiner

*Primary Examiner*—Nicholas Ponomarenko
(74) *Attorney, Agent, or Firm*—Aleksandr Smushkovich

(57) ABSTRACT

An airflow power station preferably comprises a windmill engine rotatable by wind including a main shaft and a rotational speed sensor, a compressed-air tank, a compressor charging the tank, an electric generator, a flywheel conveying rotation to the compressor and to the generator, and two pneumo-cylinders with pistons and sensors sensing their initial and ending positions. Each piston is coupled with a rod hingedly associated with a clutch controllably engaging and disengaging the piston with the flywheel. Each pneumo-cylinder is divided into an inner and an outer chamber, pneumatically communicating with the tank via an intake valve controllably supplying compressed air and a pneumo-regulator controllably switching the airflow 'on' and 'off' depending on the rotational speed of main shaft. Each pneumo-cylinder includes a reverse spring disposed in the inner chamber thereof, compressed during a work stroke of the piston and released upon return of the piston into its initial position.

3 Claims, 6 Drawing Sheets

AIRFLOW POWER STATION

FIELD OF THE INVENTION

The present invention relates to ecologically clean renewable energy generating devices, more particular to windmill devices capable of accumulating excessive wind energy during periods of a high wind flow and deploying the accumulated energy during periods of a low wind flow for electric power generation. The invention is especially usable as a supplemental electric energy source being mounted on residential and commercial buildings, which supplemental source is preferably associated with a common electric distribution grid.

BACKGROUND OF THE INVENTION AND RELATED ART

The most recent economy trend in terms of power generation is directed towards renewable energy sources saving the environment and capable of insuring a certain extent of energy independence for consumers of power. One of the most significant such sources is the conversion of wind energy into electric energy that may be conveniently used by a lot of industrial and commercial facilities, as well as by households. The wind energy conversion is commonly provided by windmill farms including a number of windmill wheels (propellers) furnished with blades driven by a wind flow. However, such farms are expensive due to the size of windmill wheels determined by economical efficiency of the farms. They also occupy significant land areas that cannot be utilized for people residence. Some other factors also negatively influence the deployment of windmill farms: they are typically built on open land sites with frequent presence of strong winds, remote from most of consumers, which necessitates arrangement of electric power transmission therefrom causing additional losses of energy; they are dangerous to birds, etc.

Various devices alternative to the windmill farms have also been proposed. Exemplarily, U.S. Pat. No. 7,242,107, issued to Dempster, provides for "systems, methods and techniques by which a wind-powered energy generating platform, secured to an anchor, can pull (or winch) itself beneath the surface of the water and thereby avoid most of the significant effects of storms and waves. In more particularized aspects, a variable-buoyancy anchor is utilized, thereby facilitating the construction and transportation of the entire assembly."

Devices of such kind still remain strongly weather-dependent, that is essentially may not generate enough power during low wind recessions. Other solutions have been proposed to accumulate energy during periods of strong winds, and use the accumulated energy during periods of low or no winds. One of the most popular methods is the conversion of excessive wind energy, rotating a turbine associated with an electric generator during the strong winds, into energy of compressed air, with a subsequent release of the compressed air to drive the generator during the low winds.

A typical example of the aforementioned method and a system therefor is described in U.S. Pat. No. 5,553,454 to Mortner that particularly teaches: "A system and method is provided for generating electrical energy by operatively connecting a generator to a drive shaft which is rotated axially when fan turbines connected to the drive shaft are rotated. The turbines are rotated by directing the release of air under pressure toward a plurality of blade surfaces of the turbines. The air under pressure is supplied from a plurality of storage tanks which are connected to one of a pair of pressure guide rings, which guide rings receive air under pressure from one or more connected tanks and direct the air through an output duct and toward the blade surfaces. The flow of air under pressure is controlled by a power regulator and controller which monitors the power output from the generator and transmits electrical signals to adjust the open and closed positioning of a tank output valve on each of the plurality of tanks. Alternatively, the drive shaft may be connected to a water pump, evaporating device, or the drive wheels of a motor vehicle for pollution-free powering of that device through the controlled release of compressed air in the plurality of tanks."

The latter device is more efficient in terms of average yearly time of operation than the previously mentioned devices. However, the compressed air directed at the blade surfaces has parameters different from the wind flow parameters that complicates the design of such device. Besides, Mortner gives no indication on regulation of the rotational speed of turbines depending on the intenseness of wind flow, i.e. the regulation of rotational speed of the turbines during periods of high winds remains uncertain. The Mortner's system is not associated with any kind of electrical grid or reserve energy source, and thus would stop generating power when the pressure of compressed air in the storage tanks decreases below a certain level.

OBJECTIVES AND SUMMARY OF THE INVENTION

An objective of the invention is to provide a design for an airflow power station (a mini-power plant) utilizing the environmentally clean and renewable wind primary energy for its conversion into electrical energy, which airflow power station should be capable of accumulating excessive wind energy during periods a high wind flow in the form of compressed air energy, and deploying the accumulated compressed air energy for generating electrical power during periods of a low or no wind flow. The airflow power station should preferably be convenient for use in modern urban conditions (e.g. can be built on top of a building) and should preferably be associated with an existing power grid. In some embodiments such airflow power stations can be suitably associated with the existing common grid.

Another objective is to provide a design of the airflow power station as a combination of units, including an electrical generator, which combination should be capable of efficient regulation of the rotational speed of the generator during the periods of high winds, low winds, and absence of winds, thereby providing appropriate regimes for operation of electric power consuming equipment.

Other objectives of the instant invention may become apparent to those skilled in the related art upon learning the present disclosure.

The objectives are achieved by providing an inventive airflow power station, which station in a preferred embodiment comprises a windmill engine rotatable by wind and including a main shaft and a rotational speed sensor; a compressed-air tank; a compressor charging the tank; at least one electric generator; a flywheel conveying rotation to the compressor and to the at least one generator; and two (generally, it can have another suitable number of) pneumo-cylinders with pistons and sensors sensing their initial and ending positions. Each piston is coupled with a rod hingedly associated with a clutch controllably engaging and disengaging the piston with the flywheel. Each pneumo-cylinder is divided by its piston into an inner and an outer chamber. The outer chamber pneumatically communicates with the tank via an intake valve controllably supplying compressed air into the outer chamber, and via a pneumo-regulator controllably switching the airflow 'on' and 'off' depending on the rotational speed of main shaft measured by the speed sensor. Each pneumo-cylinder includes a reverse spring disposed in the inner chamber thereof; the spring is compressed during a work stroke of the piston and is released upon return of the piston into its initial position. In optional embodiments, the airflow power station includes a muff capable of controllable engaging or disengaging the flywheel with the main shaft depending on the rotational speed of the main shaft measured by the speed sensor.

Figure 1:
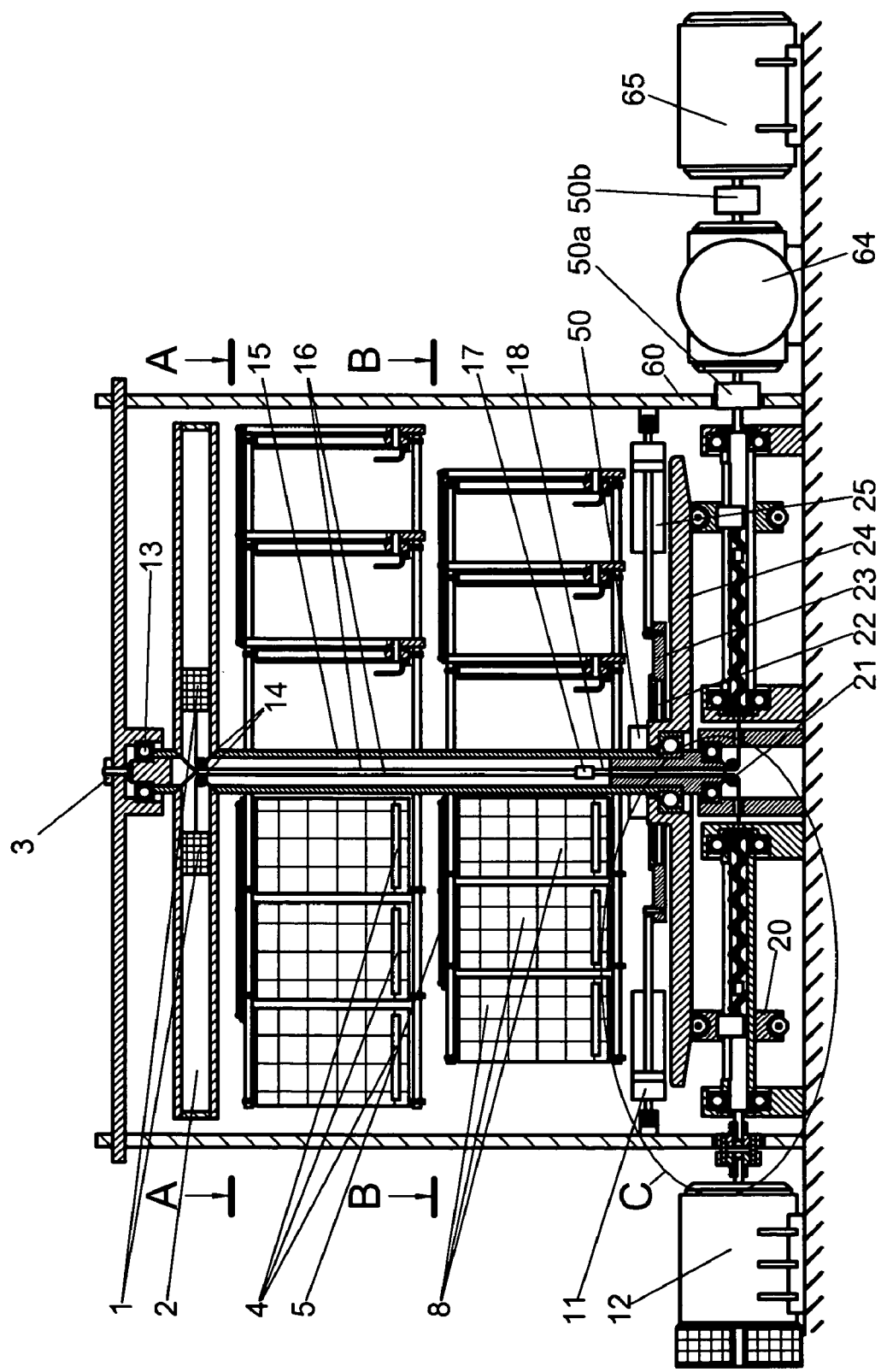
FIG. 1 is a general sectional view of the airflow power station, according to a preferred embodiment of the present invention.

Each reference numeral indicated on the abovementioned figures denotes an element of the inventive structures described herein below. Identical elements on different figures are denoted by identical reference numerals, unless otherwise stated in the description. A first time introduced reference numeral in the description is enclosed into parentheses.

GENERAL DESIGN PRINCIPLES OF THE INVENTION

The inventive airflow power station (APS) includes a number of units each performing an important function to provide the aforesaid objectives. In preferred embodiments, the units are integrated into the power station by means of a preferably computerized control system (not illustrated herein) providing regulation of the units based on a certain program. These units are enumerated below.

The APS comprises a windmill engine, preferably of a vertical rotor type. The windmill engine is furnished with vane supports securing pivotal vanes of a suitable configuration. The windmill engine has a main shaft associated with a speed sensor measuring the rotational speed of the main shaft.

The APS also comprises at least one tank for storage of compressed air that functions as an accumulator of pneumatic energy.

The APS comprises at least one air compressor, pneumatically connected to and capable of charging the tank with compressed air to a predetermined pressure. Modern compressors may have sufficiently high productivity (about 100 volumetric feet per second) that allows pumping air into the tank automatically even at short-time wind gusts.

The APS comprises at least one electrical generator for generating electric energy. The generator includes a generator shaft.

The APS comprises a flywheel. In preferred embodiments, the flywheel is controllably associated with the main shaft through a first muff capable of engaging or disengaging the flywheel and the main shaft. Also, in preferred embodiments, the flywheel should be controllably associated with the shaft of the air compressor through a second muff. In the other words, the flywheel can be connected to the main shaft and to the air compressor shaft, or can be released therefrom, depending on the mode of operation of the APS. In optional embodiments, the flywheel can be fixedly attached to the main shaft. The flywheel is used for essential equalizing the rotational speed of the windmill engine and reducing speed fluctuations when the speed is affected by wind gusts, and also functions as a driving mechanism of an engagement gear, conveying rotation to the generator and to the compressor, wherein the gear may be chosen of a frictional engagement type, or of a magnetic engagement type.

The APS comprises at least one pneumatic cylinder. In preferred embodiments, the APS comprises a pair of pneumatic cylinders, mounted preferably above the flywheel. The pneumatic cylinders are furnished with pistons slidely disposed and capable of reciprocating therein. The pair of cylinders in fact functions as a piston pneumo-engine. Each piston is coupled with a rod at its first end. The second end of each rod is hingedly coupled with a conventional unidirectional clutch preferably having an annular shape and mounted on the upper plane of the flywheel. The second ends of the rods are situated diameteraly opposite to each other on the clutch. The unidirectional clutch is capable of providing an engagement of the pistons and a release thereof from the flywheel at predetermined angles between the counterparts of the clutch. Therefore, the rods can drive the flywheel through the clutch during a work stroke of the cylinders.

Each pneumo-cylinder is divided by its piston into two chambers (an inner chamber located closer to the clutch, and an outer chamber located farther from the clutch) of variable volume depending on a current position of the piston. The outer chambers of the cylinders pneumatically communicate with the compressed air tank via an intake valve. The intake valve is connected with a pneumo-regulator capable of switching the supplied compressed air 'on' and 'off' depending on the operation mode of APS (i.e. it's powered either by the windmill engine or by the pneumo-cylinders) set by the control system depending on the rotational speed of the main shaft measured by the speed sensor. The intake valve supplies a dose of compressed air into the outer chambers during the work stroke. The outer chambers of cylinders are connected with a discharge valve, through which the exhaust air exits into the atmosphere after the work stroke. The inner chambers communicate with the atmosphere via suitable orifices.

Each pneumo-cylinder includes a reverse spring disposed in the inner chamber thereof. The reverse spring is compressed during the work stroke, and returns the piston in its initial position after the work stroke, where the piston will wait for the next work stroke. The initial position is detected by a first sensor of a suitable type mounted on the outer chamber of the corresponding cylinder. The ending position of the piston after the work stroke is detected by a second sensor mounted on the inner chamber of the corresponding cylinder. The control system receives corresponding signals from the first and second sensors, and activates or deactivates the intake valve respectively.

The APS preferably comprises an inertial regulative system built in the windmill engine, and used for regulation of the rotational speed thereof; the inertial regulative system includes weight members. In optional embodiments other types of rotational speed regulation systems can be utilized.

The APS comprises a number of driven wheels of the engagement gear, wherein the driven wheels are associated with the shafts of air compressor and generators. Each driven wheel includes a number of rollers. The rollers are rotatably mounted on axles peripherally disposed at the circumference of the driven wheel. The rollers of the frictional version are made of a suitable type of rubber (the rollers of the magnetic version may include magnets of a suitable type, whereas the corresponding surface portion of the flywheel is made, for example, of soft iron or similar material, and there is a predetermined clearance between the magnets and the corresponding surface of flywheel). The axes of the rollers are perpendicular to the axis of the generator shaft. The rollers of driven wheels are frictionally (or magnetically) engaged with the underside of the flywheel. Alternatively, other types of engagement gears can be adapted for employment in the APS.

The compressor and generator each has a rotatably-supported solid cylindrical shaft coupled to an elongated tubular shaft. The elongated shaft is furnished with a longitudinal inner groove, so protruded that is located under the flywheel. The elongated shaft is supplied with a dowel capable of linear displacement along the groove when pulled by a cable attached to the weight members of the inertial system. The elongated shaft also contains a spring connected to the dowel and counter-acting the pulling force of the weight member. Each driven wheel is rotatably mounted on the elongated shaft, and is also coupled to the corresponding dowel, and therefore is capable of linear displacement along a radial direction of the flywheel so that it may be located in an operative zone of engagement with the flywheel, or may be controllably displaced out of the operative zone with no engagement. The rotational speed of each driven wheel is determined by a ratio of the circumference of an 'orbit' to the circumference of driven wheel. The 'orbit' is defined as a circle of a radius of the flywheel from its center to the point of engagement with the corresponding driven wheel. This method of regulation of the rotational speed of the windmill was disclosed in U.S. Pat. No. 6,960,062 issued to the instant inventors, and is hereby incorporated by reference in its entirety. Other optional mechanisms for maintaining minimal fluctuations of the rotational speed of the generator and compressor can be alternatively utilized.

The APS can generate electric power converting either the wind flow energy, or the accumulated compressed air energy into electric energy, maintaining a suitable rotational speed and a suitable range of voltage of the generator. It does not significantly depend upon the duration of wind activities, and hence essentially increases the total annual time of electric energy generation. The conversion involves only ecological clean renewable types of energy: wind airflow energy and compressed air energy, wherein the compression of air is mainly provided by conversion of the wind airflow energy accumulated during periods of high winds.

Thusly, the APS factually includes two motor units: the windmill engine and the pair of pneumo-cylinders, which pair employs compressed air as an operation fluid and provides electric power generation of the APS substantially during the periods of time with low or no wind flow. It is necessary to replenish compressed air of a predetermined pressure in the outer chambers of cylinders when their pressure drops after the work stroke, which is accomplished through controllable adding a certain dose of pressurized air from the compressed air tank via the intake valve.

The aforesaid speed sensor, measuring the rotational speed of the main shaft, conveys its signals to the control system that connects the pneumo-regulator to the common electric grid at a predetermined minimum of the rotational speed, which causes opening its valve and inletting the airflow from the storage tank via the intake valve into the outer chambers of pneumatic cylinders. This switches the station's mode over from a 'windmill' mode to a 'pneumo-engine' mode. When the wind flow speed increases to a predetermined threshold, the control system switches the 'pneumo-engine' mode back to the 'windmill' mode, driving the generator by the wind flow, and at the same time accumulating the compressed air energy in the tank. An 'emergency' mode can optionally be established by coupling the air compressor with an additional electro-motor powered up from the common electric grid. During a wind recession, and when the air pressure in the tank drops below a certain minimal threshold, the electromotor is controllably connected to the electric grid and drives the air compressor that pumps air into the tank until the air pressure therein reaches a certain level. In the emergency mode the air compressor should be disengaged from the flywheel. The accumulated compressed air should be used for driving the generator, when the wind flow is low or absent, and simultaneously the electric grid is switched off for any energy system reasons.

DETAIL DESCRIPTION OF PREFERRED EMBODIMENTS OF THE INVENTION

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

Referring to a preferred embodiment of the present invention illustrated on FIGS. 1, 1a, 1b, and 1c there is shown a windmill engine of the APS and parts of the engine. The windmill engine comprises a stationary frame (60), a main vertical shaft (15) supported by bearings (13) and (43) mounted in the frame 60. In preferred embodiments, the windmill engine comprises an upper carousel and a lower carousel of vertical pivotal vanes (8). In optional embodiments another number of carousels can be used.

Figure 1A:
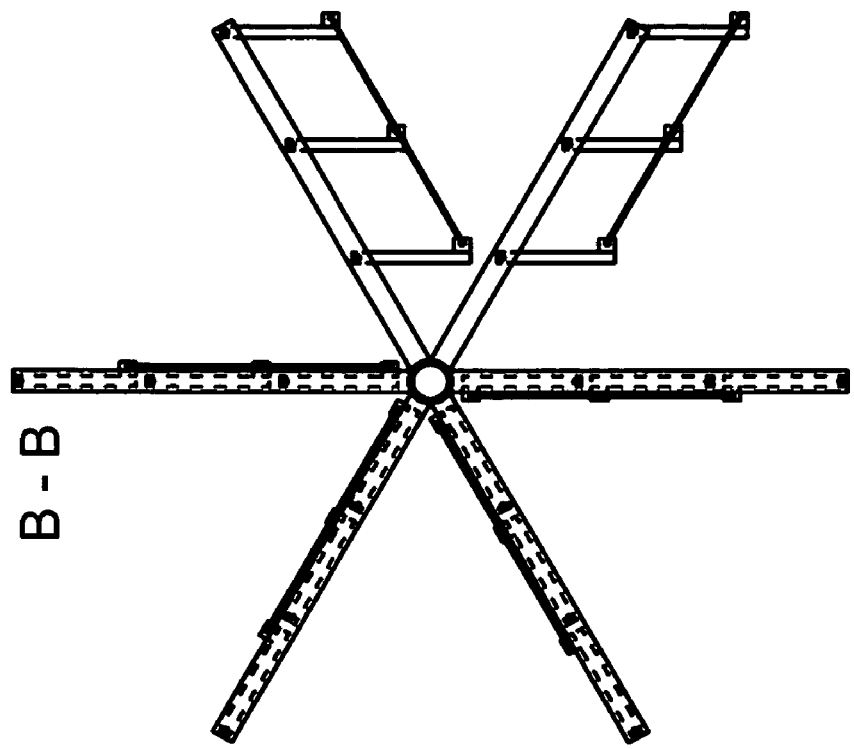
FIG. 1a is a number of fragmental views showing details of the airflow power station, according to the preferred embodiment of the present invention illustrated on FIG. 1.
Figure 1A:
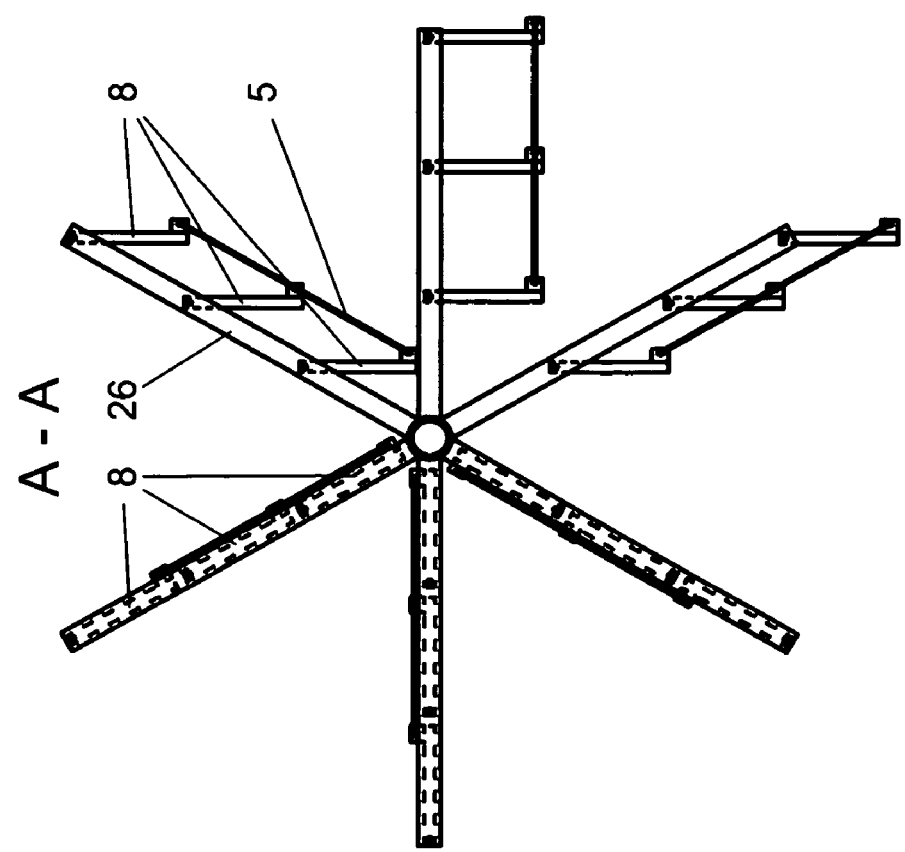
Figure 1B:
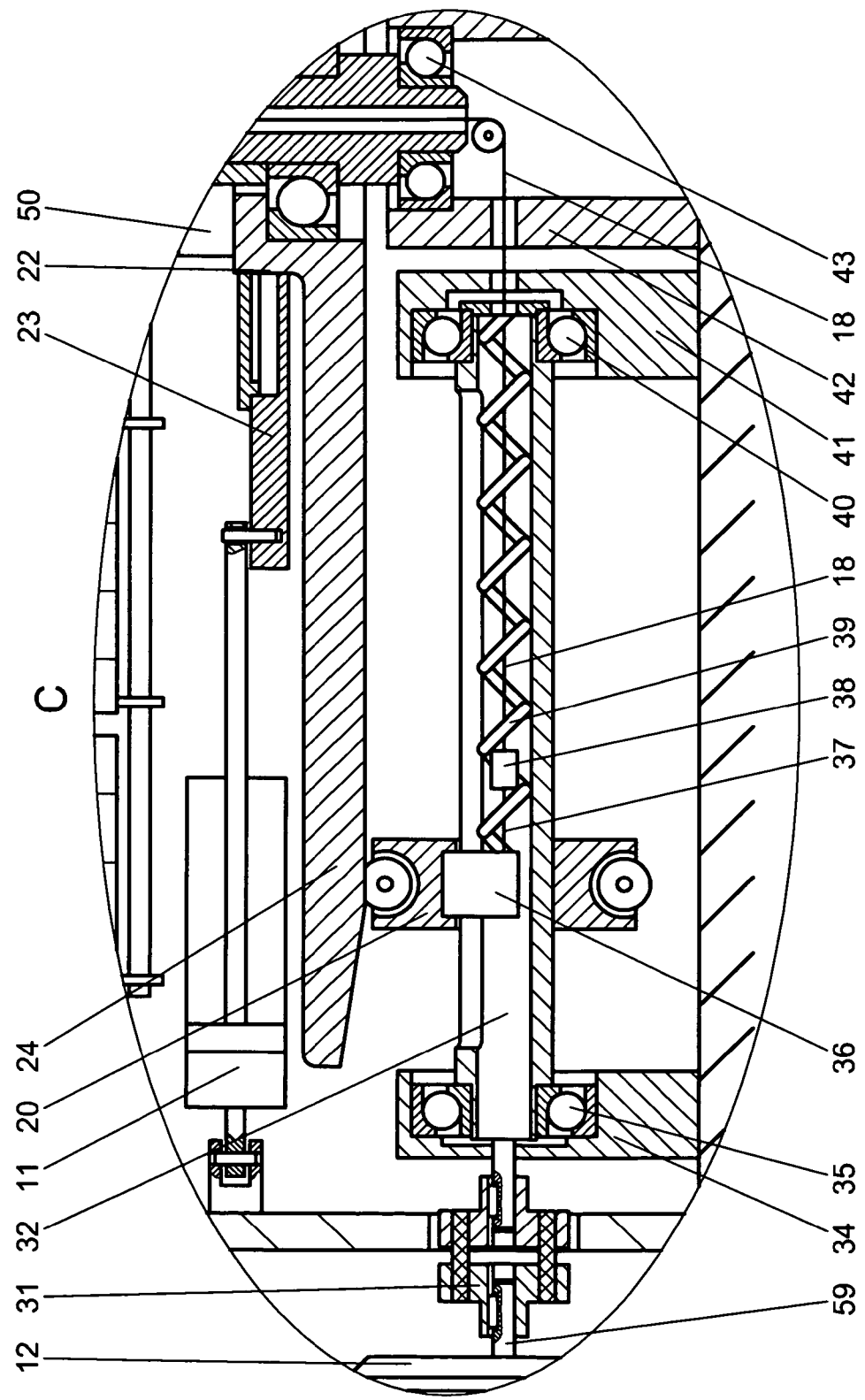
FIG. 1b is a fragmental view showing a portion of the airflow power station, according to the preferred embodiment of the present invention illustrated on FIG. 1.
Figure 1C:
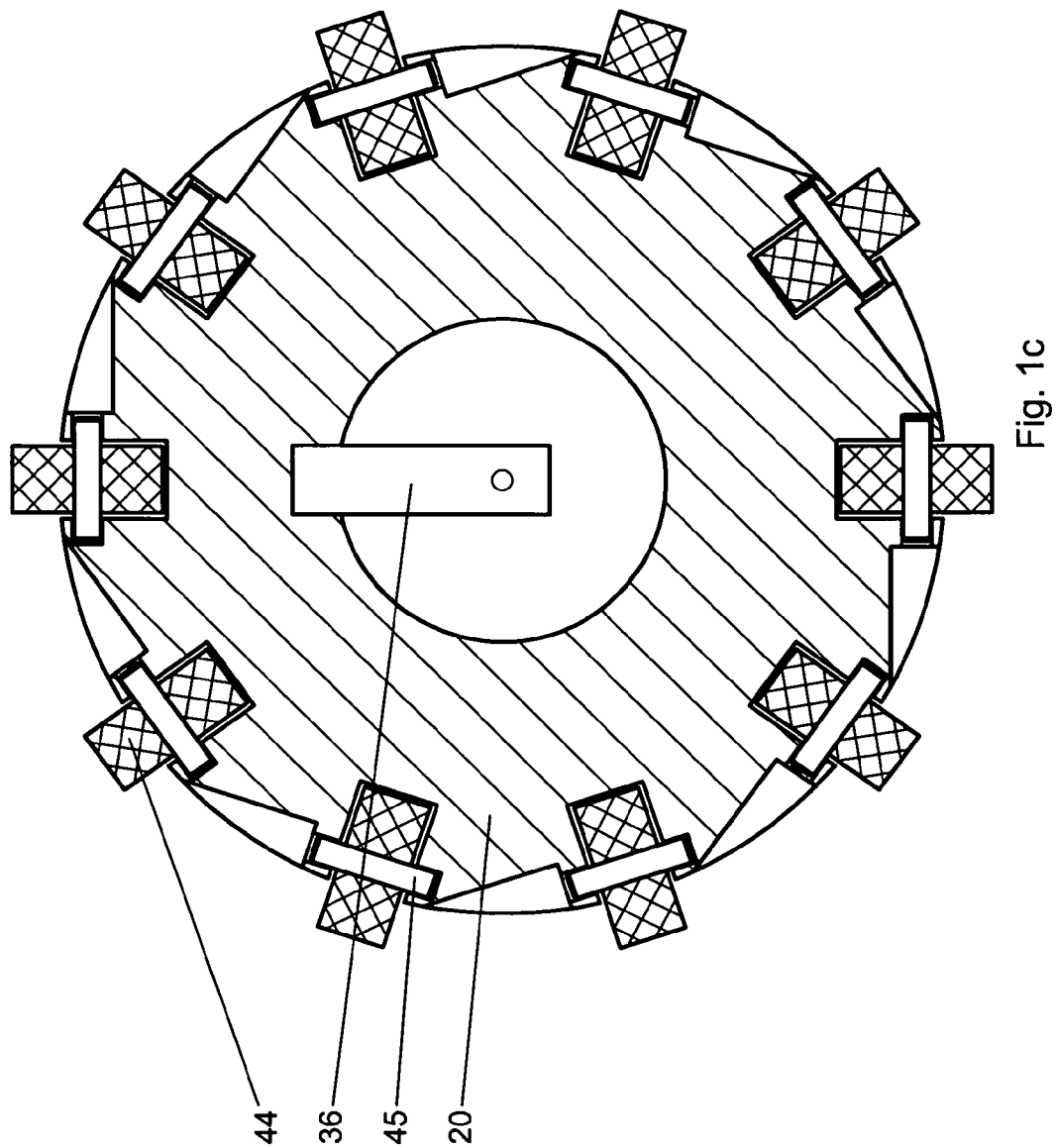
FIG. 1c is a fragmental sectional view showing certain elements of the airflow power station, according to the preferred embodiment of the present invention illustrated on FIG. 1.

The vanes 8 of the carousels are pivotally arranged on a number of horizontal vane supports (26) as shown on FIG. 1a. The supports 26 are fixed with their first ends to the main shaft 15 in a 'six-leg-star' shape (the number of 'legs', of course, may differ in optional embodiments). Preferably the vanes 8 are situated under the supports 26. The bottom ends of one corner (e.g. left bottom corner) of the vanes 8 attached to one support 26 are joined by a rigid lever (5). The vanes 8 preferably have slots (4) that enhance efficiency of deployment of the wind flow. The windmill engine may optionally comprise vanes and their support means of other configurations.

The windmill engine has a speed sensor (3) measuring the rotational speed of main shaft 15 and associated herewith.

The APS comprises a tank (47) for storage of compressed air that functions as an accumulator of pneumatic energy. A pressure sensor (66) is pneumatically associated with the tank 47 for measuring its pressure further used by the control system as discussed below.

Figure 3:
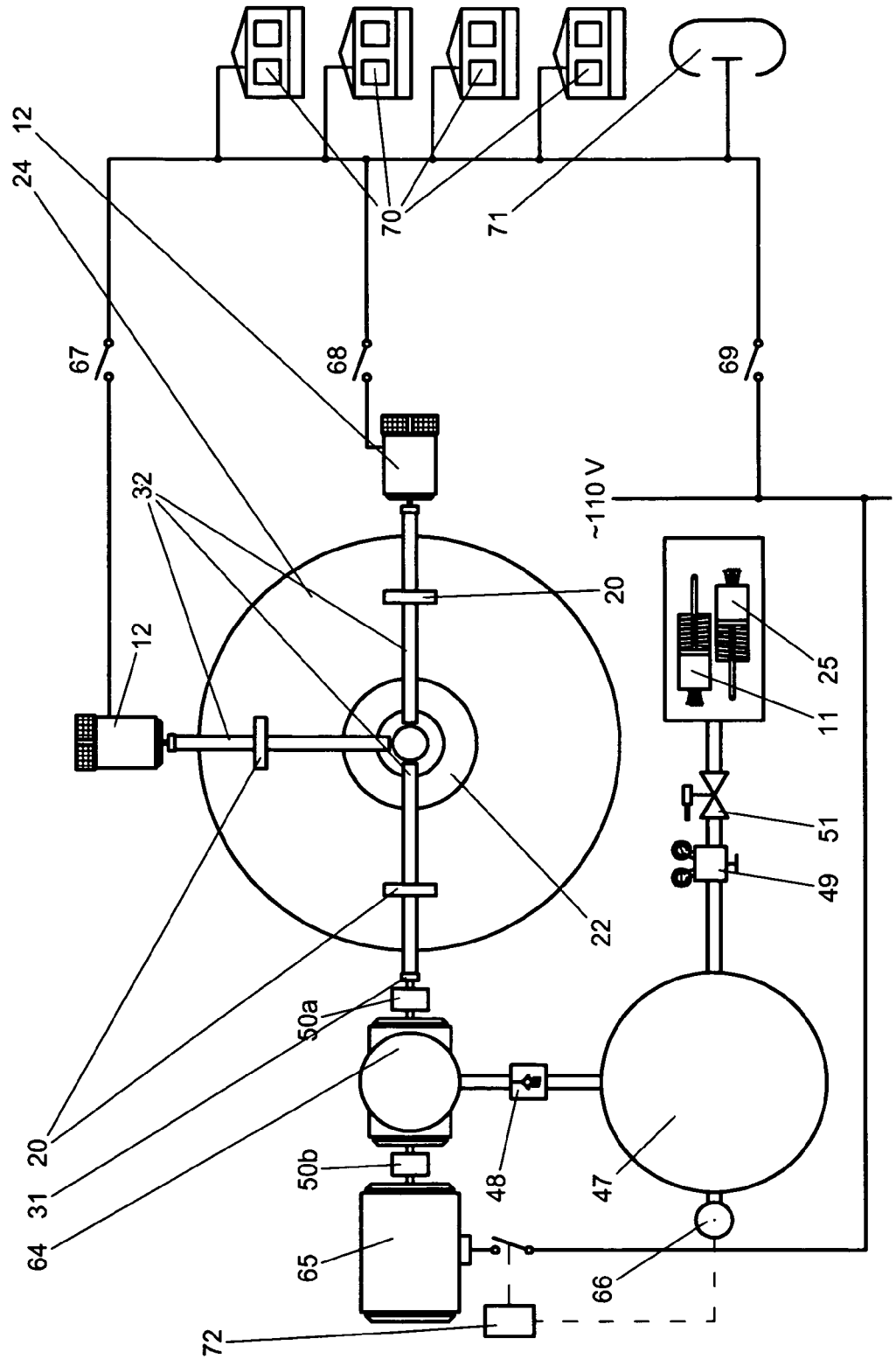
FIG. 3 is a general schematic view showing basic units with electrical connections of the airflow power station, according to the preferred embodiment of the present invention illustrated on FIG. 1.

The APS comprises an air compressor (64), shown on FIG. 3, pneumatically connected to and capable of supercharging the tank 47 with compressed air via a charging unidirectional valve (48). The air compressor has a compressor shaft (not specifically shown).

As shown on FIG. 3, in a preferred embodiment, the APS comprises two electrical generators (12) for generating electric energy. Each generator 12 has a rotatably-supported cylindrical generator shaft (59). The generators 12 are electrically connected through switches (67) and (68) to a common bus (71) that is capable to power up a number of electric consumers (70). The bus 71 is controllably connected to a common electric grid via a switch (69).

The APS comprises a flywheel (24). In preferred embodiments, the flywheel 24 is controllably associated with the main shaft 15 through a suitable muff (50) capable of engaging or disengaging the flywheel 24 and the main shaft 15 depending on the operation mode: the windmill mode or the pneumo-engine mode. In preferred embodiments, the flywheel 24 is controllably associated with the shaft of the air compressor 64 through a second muff (50a). The air compressor 64 is controllably associated with an additional electromotor (65) through a third muff (50b). The electromotor 65 is connected essentially to the common grid via a launcher relay (72) switchable 'on' and 'off' by the control system depending on the mode of operation of the APS, and the air pressure in the tank 47, measured by the sensor 66.

The APS comprises an inertial speed regulative system built in the windmill engine, and used for regulation of the rotational speed thereof depending on the wind flow speed. The inertial regulative system includes weight members (1) slidely disposed within a tube (2). The weigh members are attached by: cables (16) passed on rollers (14) and coupled to a connector (17) further connected to a common cable (18). The connector 17 has a bearing inside that allows for rotation of the shaft independently from the cable 18, which is not rotating.

The APS comprises a number of driven wheels (20) of the engagement gear, wherein the driven wheels 20 are substantially associated with the shaft of air compressor 64 (through the muff 50a) and the generator shaft 59 (through the muff 50). Each driven wheel includes a number of rollers (44). The rollers 44 are rotatably mounted on axles (45) peripherally disposed at the circumference of the driven wheel 20. The rollers of the frictional version are preferably made of a suitable type of rubber. The axles 45 are perpendicular to the longitudinal axis of generator shaft 59 and are parallel to the plane of flywheel 24. The rollers 44 are frictionally (or magnetically) engaged with the underside of the flywheel 24.

The generator shaft 59 is coupled with an elongated tubular shaft (32) via a shaft connector (31). A similar connection (not shown) is used for coupling the compressor shaft with the corresponding elongated shaft. The elongated shaft 32 is furnished with a longitudinal inner groove, and is so protruded that its most portion is located under the flywheel 24. The elongated shaft 32 internally is supplied with a dowel (36) capable of linear displacement along the groove when pulled by the cable 18 attached to the weight members 1 of the inertial speed regulative system. The elongated shaft 32 also internally contains a spring (39) coupled to the dowel 36 and counter-acting the pulling force of the weight members 1. Each driven wheel 20 is fixed to and rotatably supported by the elongated shaft 32, and is also coupled to the corresponding dowel 36. The elongated shaft 32 is supported by bearings (35) and (40) mounted in respective stationary members (34) and (41). The elongated shaft 32 internally contains a connector (38) having a bearing inside that allows for rotation of the shaft 32 independently from the cable 18, which is not rotating. An additional piece of cable (37) is tied to the connector 38, and by its second end is tied to the dowel 36.

The preferred embodiment of APS comprises a pair of pneumatic cylinders (11) and (25), mounted preferably above the flywheel 24. The pneumo-cylinders 11 and 25 are furnished with pistons slidely disposed and capable of reciprocating therein. Each piston is coupled with a rod at its first end. The second end of each rod is hingedly coupled with a unidirectional clutch (22) having an annular shape and mounted on the upper plane of the flywheel 24. The second ends of the rods are situated diameteraly opposite to each other on the clutch 22. The unidirectional clutch 22 is capable of providing an engagement of the pistons and a release thereof from the flywheel 24 at predetermined angles. Thusly, the rods can drive the flywheel 24 through the clutch 22 during a work stroke of the cylinders 11 and 25.

Figure 2:
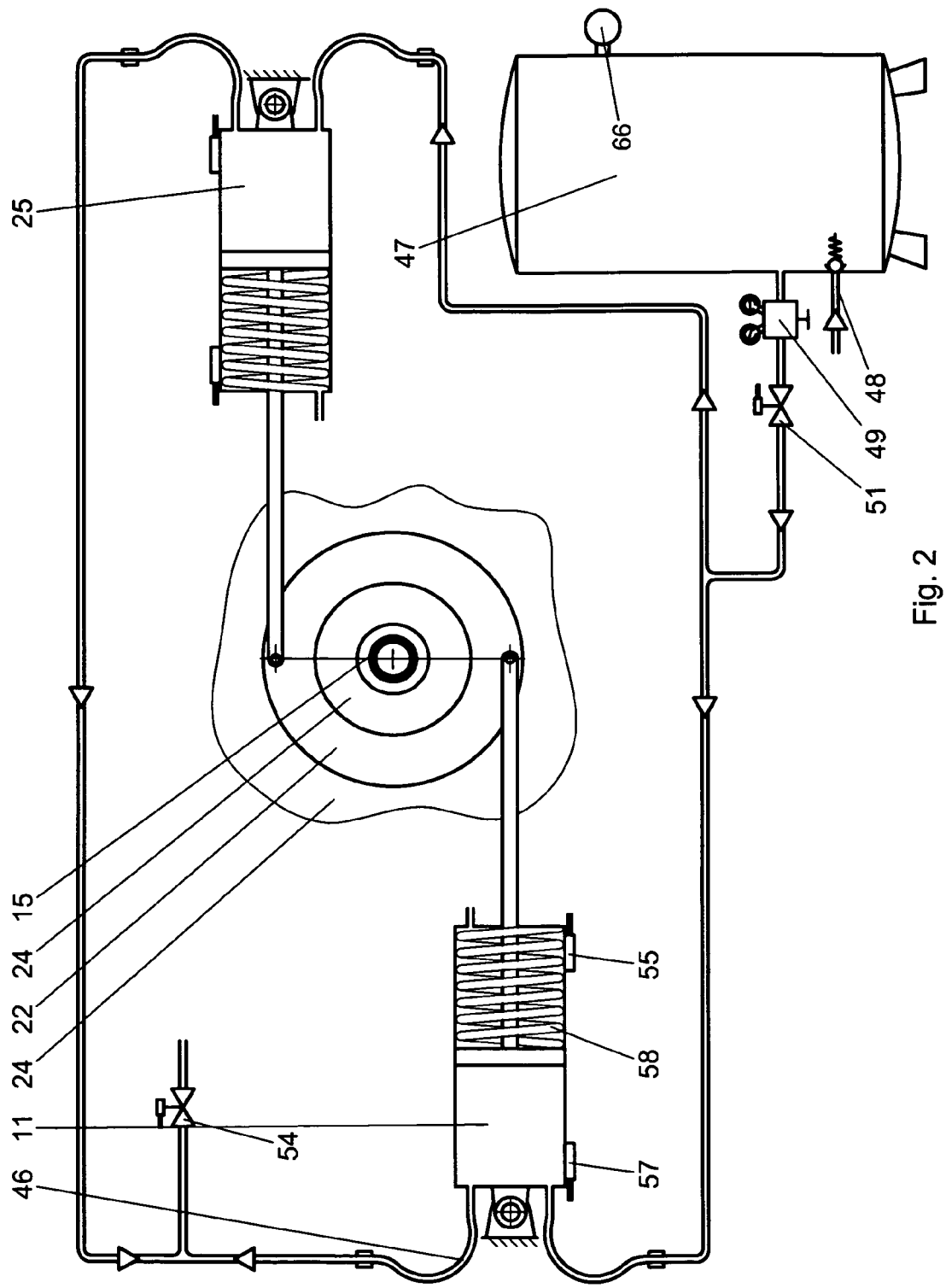
FIG. 2 is a general schematic view, showing pneumatic cylinders of the airflow power station, according to the preferred embodiment of the present invention illustrated on FIG. 1.

Each of the pneumo-cylinder 11 and 25 is divided by its piston into two chambers (an inner chamber located closer to the clutch, and an outer chamber located farther from the clutch as shown on FIG. 2) of variable volume depending on a current position of the piston. The outer chambers of the cylinders pneumatically communicate with the compressed air tank 47 substantially via an intake valve (51). The intake valve 51 is connected with a pneumo-regulator (49) capable of switching the supplied compressed air 'on' and 'off' depending on the operation mode of APS (i.e. whether it's powered by the windmill engine or by the pneumo-cylinders) set by the control system depending on the rotational speed of the main shaft 15 measured by the speed sensor 3. The intake valve 51 controllably supplies a predetermined dose of compressed air into the outer chambers during the work stroke. The outer chambers of cylinders 11 and 25 are connected via a pipe (46) with a discharge valve (54), through which the exhaust air exits into the atmosphere after the work stroke. The inner chambers communicate with the atmosphere via suitable orifices.

Each pneumo-cylinder includes a reverse spring (58) disposed in the inner chamber thereof. The reverse spring 58 is compressed during the work stroke, and returns the piston in its initial position after the work stroke, where the piston will wait for the next work stroke. The initial position of the piston is detected by a first sensor (57) of a suitable type mounted on the outer chamber of the corresponding cylinder. The ending position of the piston after the work stroke is detected by a suitable second sensor (55) mounted on the inner chamber of the corresponding cylinder. The control system receives corresponding signals from the first sensor 57 and second sensors 55, and activates or deactivates the intake valve 51 respectively.

OPERATION OF THE PREFERRED EMBODIMENTS

The Windmill Engine Mode

Operation of the APS in the windmill engine mode was substantially described in the aforementioned U.S. Pat. No. 6,960,062. This mode provides for regulation of the rotational speed of the generators 12 depending upon the rotational speed of the main shaft 15, which allows for maintaining possibly low speed fluctuations of the generator shaft 59 during wind gusts due to displacements of the driven wheels 20 changing their orbits, caused by the inertial regulative systems. At the same time, the driven wheel of the compressor 64 drives the compressor 64 that charges the tank 47 with compressed air through the valve 48. The regulator 49 is in the 'off' position.

The Pneumo-Engine Mode

Operation of the APS in the pneumo-engine mode follows. When the wind flow significantly decreases, and the windmill engine mode cannot provide a predetermined lowest threshold of the rotational speed of the generator, it reduces its power generation capacity. The sensor 3 conveys the speed threshold signal to the control system that causes the regulator 49 to switch its position to 'on', and releases the muff 50, thereby disengaging the main shaft 15 from the flywheel 24. At this time the pistons of cylinders 11 and 25 are being in their initial positions since they are depressed by the springs 58, and the initial positions are sensed by the sensors 57 and are conveyed to the control system. The control systems issues a signal for opening the intake valve 51, and a predetermined dose of compressed airflow enters the outer chambers of cylinders 11 and 25. This provides a work stroke of the pneumo cylinders, moving their pistons and driving the flywheel 24 through the clutch 22 at a certain angle, compressing the springs 58 until the sensors 55 would sense the ending positions of the pistons. At this moment, the valve 51 is shut by the control system, and the springs 58 and the air pressure inside the inner chambers (practically, the atmosphere pressure) returns the pistons in their initial positions, where they will wait until the next work stroke.

When the rotational speed of the main shaft 15 increases to a predetermined magnitude, the sensor 3 will send a signal to the control system that will be able to decide whether to switch the regulator 48 back to the windmill engine mode.

The Emergency Mode

As mentioned above, in optional embodiments, the electromotor 65, powered up from the common electric grid during wind recessions, is used in the emergency mode for rotation of the compressor 64 to pump air into the tank 47 until the air pressure therein reaches a predetermined minimal level. The so accumulated pressurized air can then be used for power generation during a black out of the electric grid and simultaneous absence of the wind flow. In such a case, the muff 50a is firstly disengaged and the muff 50b is engaged coupling the compressor 64 with the electromotor 65. When the air pressure in the tank 47 reaches a predetermined level, the muff 50a will be engaged and the muff 50b will be disengaged de-coupling the compressor 64 from the electromotor 65.

If thereafter a black-out of the grid will be detected by the control system, it will issue a command to switch the regulator 48 into the pneumo-engine mode, wherein the generator 12 will generate electric energy until the air pressure in the tank 47 will drop to a predetermined minimum. This enables the APS to temporary generate electric power even in a situation with no wind flow and a simultaneous black-out of the common electric grid.

We claim:

1. An airflow power station comprising:
   a windmill engine rotatable by a wind airflow, said windmill engine including a main shaft and associated with a speed sensor measuring the rotational speed thereof;
   a compressed air storage means;
   an air compressor supplying compressed air into said storage means;
   at least one electric energy generator;
   a flywheel associated with the main shaft, said flywheel is capable of conveying rotation to said air compressor and to said at least one generator; and
   at least one pneumatic cylinder furnished with: a piston slidely disposed and capable of reciprocating therein, sensors sensing an initial and an ending positions of the piston, and a rod; a first end of said rod is coupled with said piston, a second end of said rod is hingedly coupled with a unidirectional clutch so mounted that is capable of a controllable engagement of said piston with and a controllable disengagement thereof from said flywheel at predetermined positions of said piston; said pneumo-cylinder is divided by its piston into an inner chamber, and an outer chamber; said outer chamber pneumatically communicates with said compressed air storage means via an intake valve capable of controllable supplying a predetermined dose of a compressed air flow from said storage means into said outer chamber and of controllable shutting the compressed air flow corresponding to said initial and ending positions of said piston, said intake valve is connected with a pneumo-regulator capable of controllable switching the supplied compressed air flow 'on' and 'off' depending on the rotational speed of said main shaft measured by said speed sensor; said pneumo-cylinder including a reverse spring disposed in the inner chamber thereof and capable to be compressed during a work stroke of said piston and to be released upon return of said piston into its said initial position.

2. The airflow power station according to claim 1, further including a first muff capable of controllable engaging or disengaging said flywheel with said main shaft, and a second muff capable of controllable engaging or disengaging said flywheel with said air compressor, depending on the rotational speed of said main shaft measured by said speed sensor.

3. The airflow power station according to claim 2, further including an electric motor controllably mechanically associated with the shaft of said air compressor through a third muff, said electric motor is controllably electrically connected to a common electric distribution grid.

* * * * *